(12) United States Patent
Foster et al.

(10) Patent No.: US 7,603,955 B2
(45) Date of Patent: Oct. 20, 2009

(54) SLEEVE BEARING FOR RAILWAY TRACTION MOTOR

(75) Inventors: Robert B. Foster, Erie, PA (US); Paul Bien, Downers Grove, IL (US); John E. Macklin, Fremont, NE (US)

(73) Assignee: Magnus Div. of L.V. Ventures, Inc., Fremont, NE (US)

( * ) Notice: Subject to any disclaimer, the term of this patent is extended or adjusted under 35 U.S.C. 154(b) by 341 days.

(21) Appl. No.: 11/680,729

(22) Filed: Mar. 1, 2007

(65) Prior Publication Data

US 2007/0165974 A1    Jul. 19, 2007

Related U.S. Application Data

(63) Continuation-in-part of application No. 11/178,937, filed on Jul. 11, 2005, now Pat. No. 7,308,856.

(51) Int. Cl.
*B61F 5/26* (2006.01)
*F16C 17/00* (2006.01)

(52) U.S. Cl. .................. 105/218.1; 384/7

(58) Field of Classification Search .......... 105/218.1, 105/218.2; 384/7, 13, 91, 93
See application file for complete search history.

(56) References Cited

U.S. PATENT DOCUMENTS

| | | |
|---|---|---|
| 2,980,472 A | 4/1961 | Harkenrider |
| 3,827,769 A | 8/1974 | Boller et al. |
| 3,905,659 A | 9/1975 | Renk et al. |
| 3,940,189 A | 2/1976 | Renk et al. |
| 3,941,438 A | 3/1976 | Charlton |
| 4,229,056 A * | 10/1980 | Renk .................. 384/380 |
| 4,892,000 A | 1/1990 | Renk et al. |
| 5,038,631 A | 8/1991 | Renk et al. |
| 5,082,089 A | 1/1992 | Renk et al. |
| 5,129,156 A | 7/1992 | Walker |
| 5,996,542 A | 12/1999 | Bathurts |
| 6,460,656 B1 | 10/2002 | Jones, Jr. et al. |

* cited by examiner

*Primary Examiner*—S. Joseph Morano
*Assistant Examiner*—Robert J McCarry, Jr.
(74) *Attorney, Agent, or Firm*—Much Shelist; Milton S. Gerstein

(57) ABSTRACT

An improved sleeve bearing for locomotive traction motor that provides additional lubrication over and above that of the one central wick currently used. The sleeve bearing is provided with a recirculation system comprised of either at least two additional wicks located near the 6:00 operating location or multiple oil communication and delivery grooves passageways communicating with the oil flinger grooves placed for the purpose of collecting and providing a mechanism for providing additional lubrication for extending the oil-wetted envelope available for supporting the truck-axle journal in the axial direction.

9 Claims, 10 Drawing Sheets

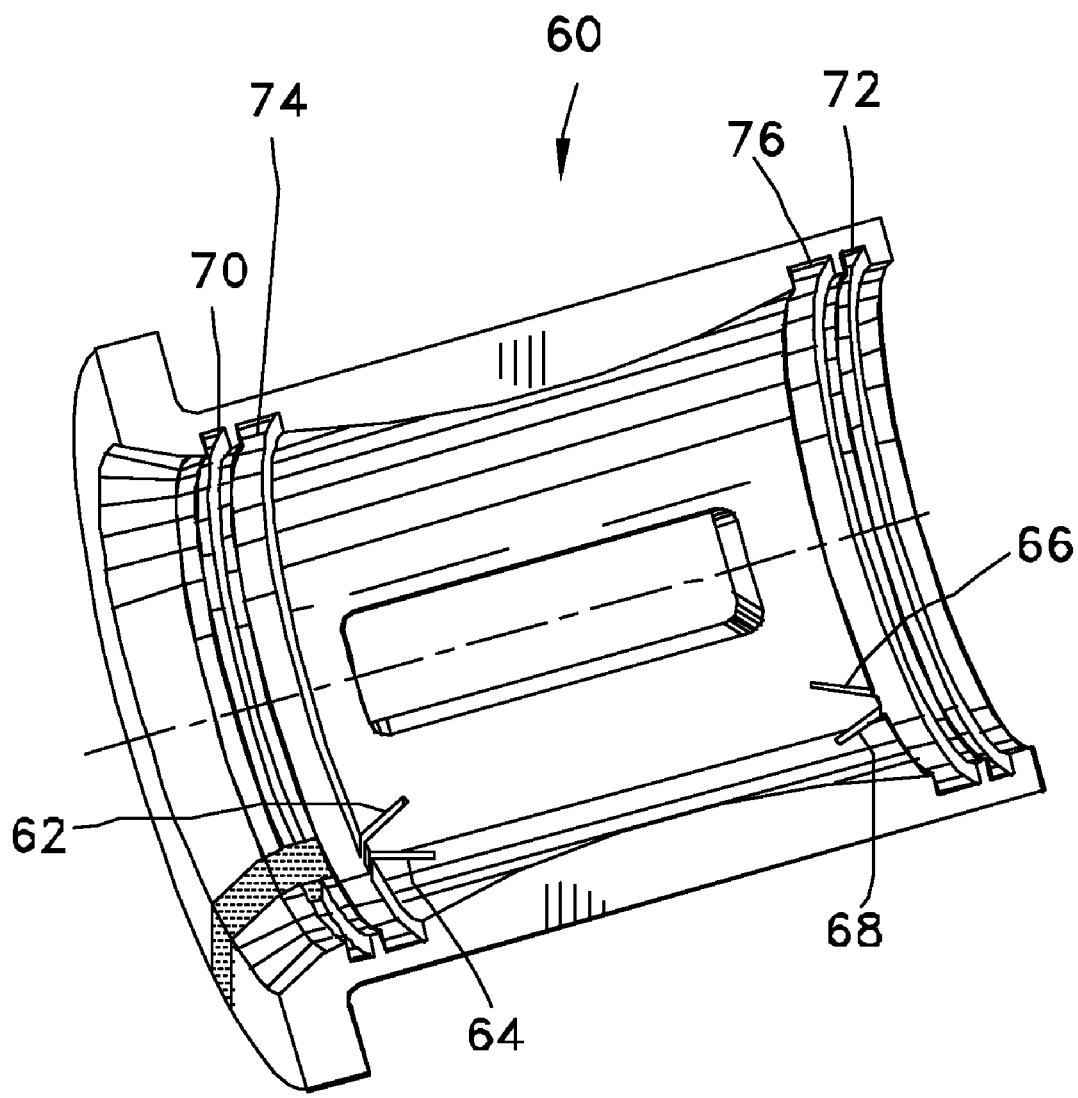

SLEEVE BEARING FOR RAILWAY TRACTION MOTOR

CROSS REFERENCE TO RELATED APPLICATION

The present application is a continuation-in-part of application Ser. No. 11/178,937, filed on Jul. 11, 2005.

BACKGROUND OF THE INVENTION

The present invention is directed to a railway locomotive traction motor and, in particular, to the friction support or sleeve bearing by which the traction motor is partially supported on the axle of the railway truck mounting the underside of the locomotive, and, in particular, the invention is directed to providing additional lubrication.

A conventional railway locomotive pinion-end (PE) traction-motor support bearing, such as that disclosed in U.S. Pat. No. 5,038,631, is shown in FIGS. 1 and 4, which FIGS. 1 and 4 show the half of the support bearing 10 that contains the window 12 for passing a lubricating wick. For best overall performance and life of the traction-motor support bearing, the load zones for loading the truck axle-journal should be centered. This is so in order that the lubricating wick (not shown) entering the interior of the bearing via the wick window or opening 12 lubricates all contacting surface-areas, which lubricating wick contacts the axle-journal through the window. In addition, both load zones should be contained within the total axial dimension of the wick if possible, again in order to ensure the best possible lubrication. Each traction-motor sleeve bearing has two load zones, an upper one and a lower one, and these tend to be heaviest around 25° from vertical because of commonly-used 25° gear-tooth pressure angle. Both load-contact patterns can be seen in the window half 10 of the PE bearing with the upper load pattern above the lubricator access-window and the lower load pattern below the window. Ideally, both upper and lower load contact-patterns should be centered at mid-length of the window, in order that the wick lubricator provides the best possible lubrication. Further, both load contact-patterns should be contained within the total axial dimension or limits of the wick lubricator if possible, again to ensure the best possible lubrication.

The lubricating wick of the conventional sleeve bearing shown in FIGS. 1 and 4 enters the bearing from the lubrication sump through a cast opening in the axle cap, which is aligned with the window or opening 12 in the bearing liner. This opening 12 is centered axially on the journal and the wick protrudes through this opening to contact the axle-journal at a position approximately 20°-30° below a horizontal line passing through the axle gear and pinion center lines. The sleeve bearing 10 also has a flange wick 16 for lubricating the flange-end 20.

The axial length of the preferred journal-to-liner contact area is defined by the axial length of the wick. The bearing liners are machined in such a way as to relieve the liners so that journal contact under normal loads remains in the wick-wetted axial area 14. In many traction motor support bearings, however, the envelope available for supporting the journal is significantly longer in the axial direction than the wick and the length of wetted area.

Pinion-end sleeve bearing load ratings are frequently limited by the axial length that can be reliably lubricated by the lubrication delivery system. If lubrication can be assured beyond the axial dispersion of conventional support bearings, that additional length may become useful for supporting the journal. By reducing the unit loading of the original journal and thereby increasing the load capacity, the criticality of other parameters affecting wear rate and reliability are lessened.

In applicants'copending application Ser. No. 11/178,937, filed Jul. 11, 2005, there has been disclosed the use of auxiliary wicks for increasing the wetted area in order to provide additional lubrication to the lateral areas beyond the width of the main central supply wick. These additional wicks are located one on either axial side of the central wick near the 6:00 location and are capable of communicating with the oil accumulated in the oil flinger grooves thereat to thereby take advantage of the oil-flinger rotating lift capability and lateral movement within the bearing lateral clearances for providing additional lubrication and for extending the envelope of the wetted area available for supporting the truck-axle journal in the axial direction. However, it has been found the felt pads constituting these auxiliary wicks may, under certain circumstances adhere to the face of the axle-journal, which may cause part of the auxiliary wick pad to be torn away during the axle-rotation. Moreover, it has been found that the additional lubrication provided by these auxiliary wicks may be better enhanced by more direct fluid communication with the respective flinger grooves which provides the lubricant supply wetting the pad faces of these auxiliary wicks. In addition, it has been found that a more optimal configuration of each auxiliary wick would be helpful in increasing the wick life.

SUMMARY OF THE INVENTION

It is a primary objective of the present invention to provide an improved sleeve bearing for a locomotive traction motor that provides additional lubricated areas in the axle bore over and above that of the conventional central wick currently used.

According to the present invention, the sleeve bearing is provided with the ability to provide additional lubrication to the lateral areas beyond the width of the main supply wick by the addition of additional wicks one on either axial side of the central wick or by incorporating passageways near the 6:00 location on either axial side capable of communicating with the oil accumulated in the oil flinger grooves and taking advantage of the oil-flinger rotating lift capability and lateral movement within the bearing lateral clearances for providing additional lubrication and for extending the envelope of the wetted area available for supporting the truck-axle-journal in the axial direction.

In one modification of the auxiliary wicks, each auxiliary wick is constructed of felt in which the length of the felt fibers constituting the wick pad are oriented in a direction perpendicular to the longitudinal axis of the axle-journal so that only contact of the ends of the felt-fibers are in contact with the journal-surface. In another modification, the auxiliary wick is provided with a projecting tail-portion that projects into the narrow gap connecting the wick-receiving and mounting opening to its respective finger groove, in order to ensure lubrication and saturation of the respective auxiliary wick from its associated finger groove. Also, in order to accommodate any increased compression of the auxiliary wick during contact with the journal-surface, the auxiliary wick is provided with a tapered cross-sectional or concave shape that allows the wick-pad to expand within its wick-receiving and mounting opening, as well as making the auxiliary wick-pad of softer felt in a durometer-hardness range less than that previously used.

BRIEF DESCRIPTION OF THE DRAWINGS

The invention will be more readily understood with reference to the accompanying drawings, wherein:

FIG. 7 is an isometric view similar to FIG. 3 and showing a third embodiment of the invention where the sleeve bearing, instead of having the additional wicks of the first and second embodiments, is provided with oil recirculation passageways originating near the 6:00 position, which passageways deliver oil from the finger/collection grooves and redistribute a portion of the oil to the lateral areas of the bearing liner beyond the wick window;

DETAILED DESCRIPTION OF THE INVENTION

Figure 1:
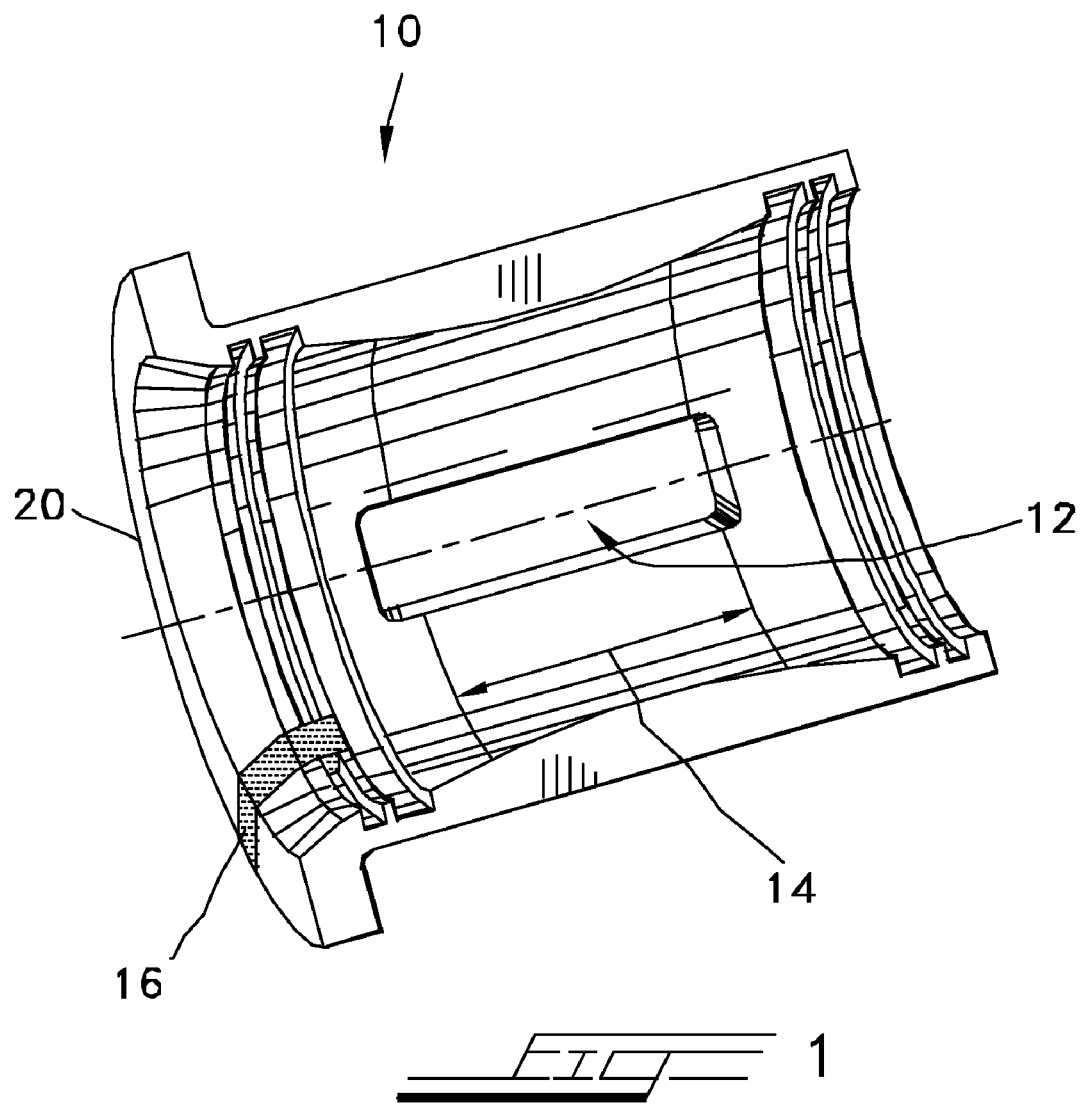
FIG. 1 is an isometric view of a window-half of a prior art sleeve bearing using one central lubricating wick.
Figure 2:
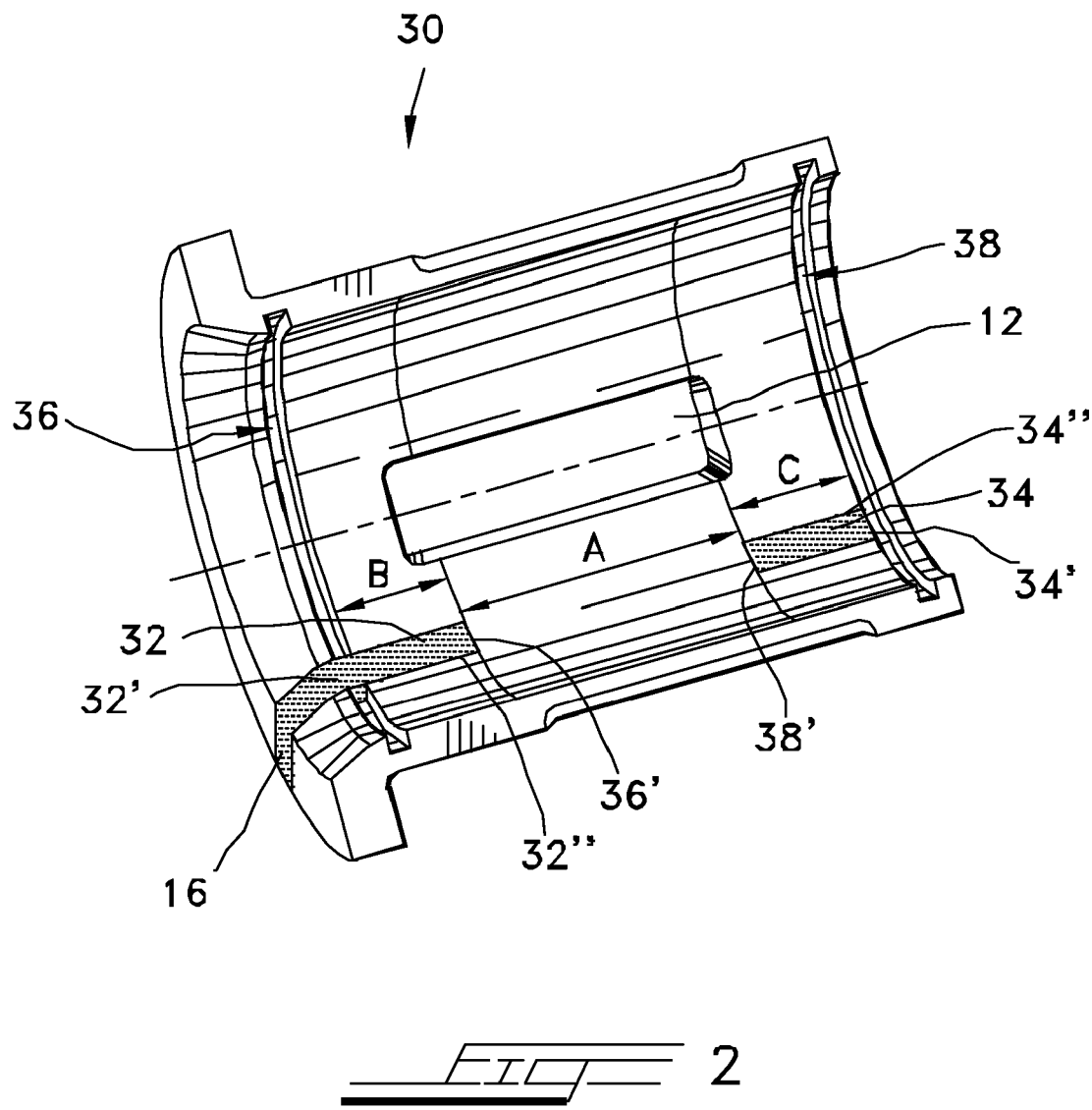
FIG. 2 is an isometric view of a first embodiment of the sleeve bearing of the invention employing the additional lubricating wicks of the invention, one on the inboard end and one on the outboard end of the sleeve bearing.
Figure 4:
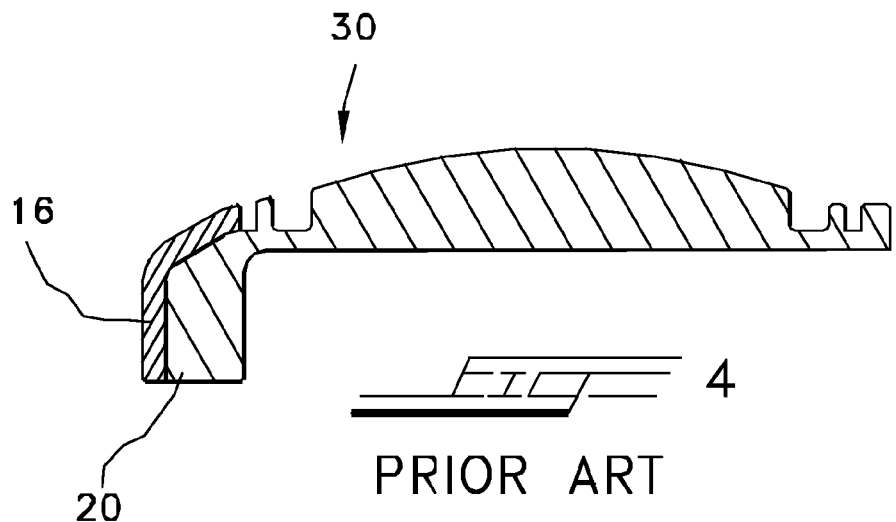
FIG. 4 is a partial longitudinal cross-section view showing a prior-art sleeve bearing having a flange wick at the flange-end, or outboard end, of the sleeve bearing.
Figure 5:
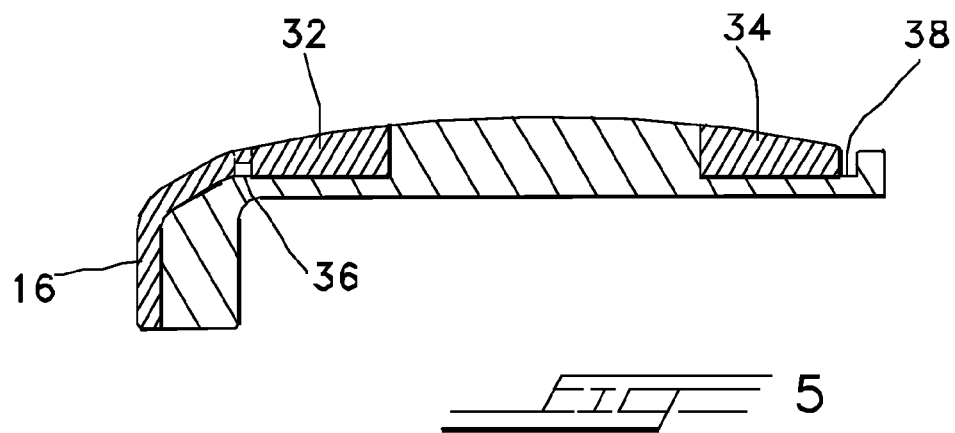
FIG. 5 is a partial longitudinal cross-section view similar to FIG. 4 but showing the sleeve bearing without flinger grooves with the additional wicks of the embodiment of FIG. 2.

Referring now to the drawings in greater detail, and to FIGS. 2 and 5 for now, there is shown a first embodiment of the railway-locomotive traction motor friction support or sleeve bearing of the invention and indicated generally by reference numeral 30. In this first embodiment, the invention is embodied in a friction support bearing that does not employ flinger grooves. Flinger grooves mount flinger rings which, when employed, help to redistribute the oil back to the oil reservoir and reduce oil loss, as disclosed in U.S. Pat. No. 3,905,659. The sleeve bearing 30 is provided with a conventional central wick window 12, as explained herein above with regard to FIGS. 1 and 4, and, in addition, at least two supplemental or auxiliary wicks, one wick 32 at the outboard end and one wick 34 at the inboard end. The supplemental wicks 32, 34 are oriented at 6:00 O'clock when viewing FIG. 2. The outboard wick 32 is combined with the currently-used flange wick 16, also explained above with reference to the prior-art bearing of FIGS. 1 and 4. The wicks 32, 34 are lubricated via lateral flow oil collection grooves 36, 38, respectively, which are used, as in the conventional manner, for collecting oil, as explained in U.S. Pat. No. 4,229,056. The provision of these additional wicks 32, 34 extend the effective length of the wetted area of the bearing to the areas encompassed by areas A, B and C in FIG. 2, to thus extend the lubricated surface from the hitherto prior-area area A, to thus make significantly longer in the axial direction the available wetted area for contact by the truck-axle journal. To ensure of the additional envelope length available, the simple reliable oil supply system 36, 38 is used. This system collects the lateral oil discharge from the loaded central region serviced by the conventional central wick and delivers the oil to those journal areas beyond the main wick wetted axial area via these additional wicks 34, 36. Thus, these oil collection grooves 36, 38 also serve the additional function of providing for this additional lubrication of the extended contact areas B and C.

The supplemental wick 32 is, in the preferred embodiment, narrower than the corresponding flange wick 16, although, if necessary, it may be the same or even greater in width. Each supplemental wick 32, 34 has a first overlapping portion 32', 34', respectively, that is received within the interior of a respective channel 36, 38, and a main longitudinal portion or section 32", 34" extending longitudinally axially in a direction toward the center of the friction bearing. With each overlapping portion 32', 34' positioned in the interior of the respective groove, each groove 36, 38 acts as a sump or reservoir for the additional wicks 32, 34. Furthermore, the main body portion 32", 34" of each wick 32, 34 is received or mounted in a recess or pocket formed in the interior shell of the friction bearing of similar shape as that of the additional wick 32, 34, in a manner similar to shown in the embodiment of FIG. 8 as described hereinbelow. Each pocket has a depth less than that of the thickness of the respective additional wick 32, 34, so that each wick 32, 34 projects or protrudes out from the respective pocket, and interiorly toward the axle-journal mounted in the bearing, for contact against the juxta-positioned surfaces of the journal located within the lateral extent of the above-mentioned contact areas B and C.

Figure 3:
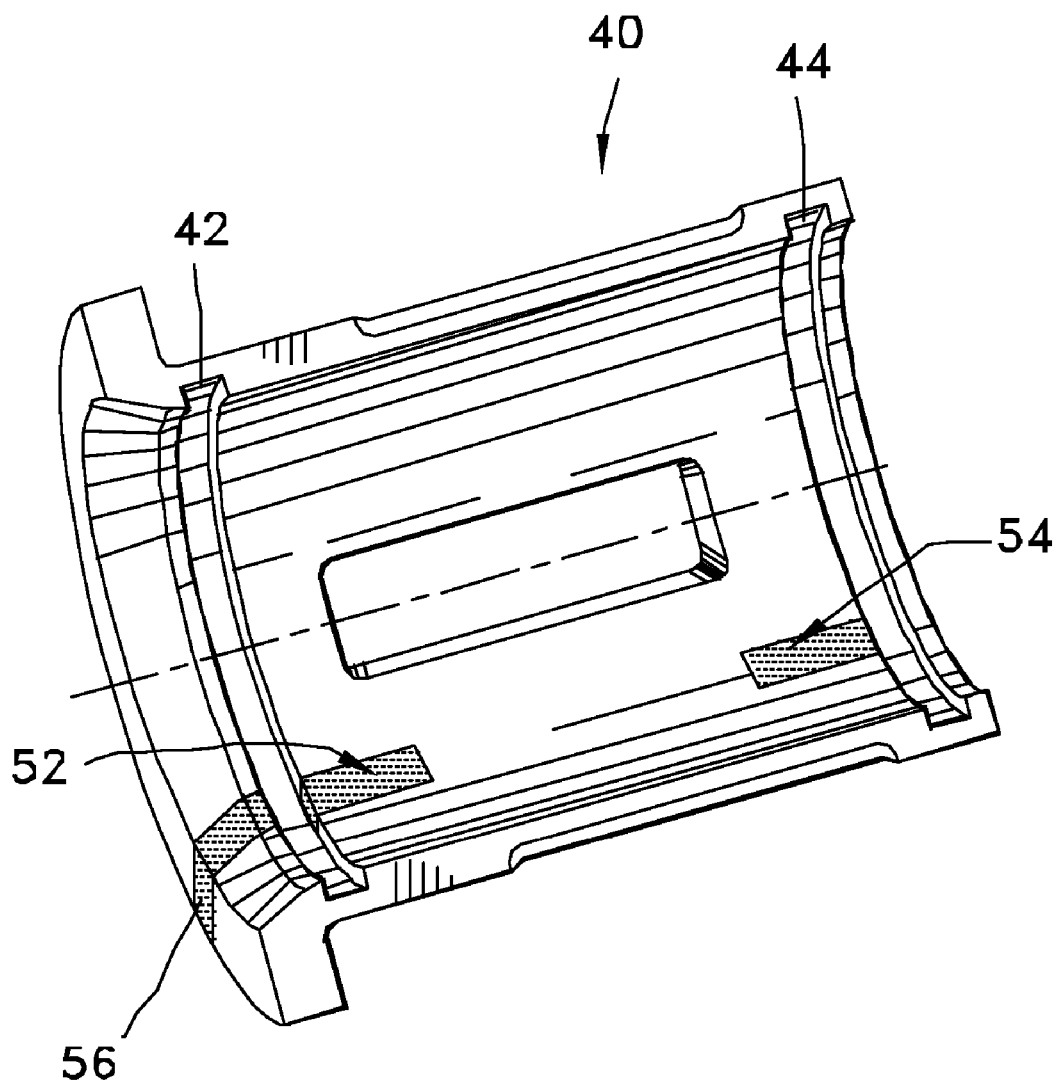
FIG. 3 is an isometric view of a second embodiment of a sleeve bearing employing the additional lubricating wicks, one on the inboard end and one on the outboard end of the sleeve bearing where the bearing employs flinger grooves.
Figure 6:
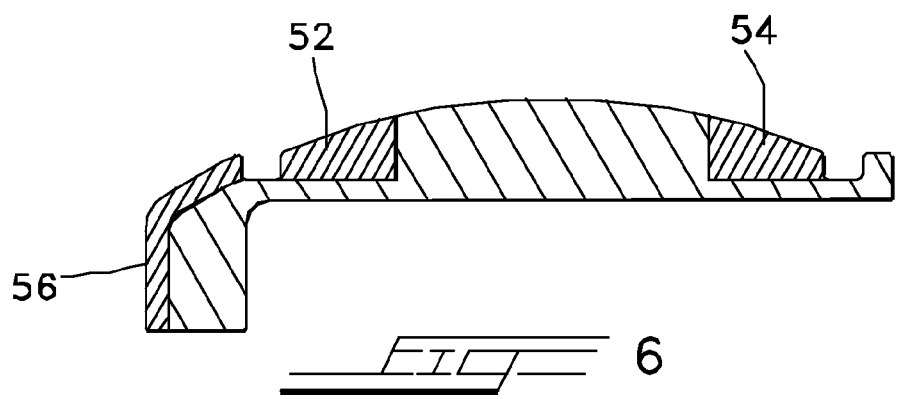
FIG. 6 is a partial longitudinal cross-section view similar to FIG. 5 but the showing the sleeve bearing utilizing flinger grooves with the additional wicks of the embodiment of FIG. 3.

Referring now FIGS. 3 and 6, there is shown a second embodiment of the sleeve bearing of the invention, which is directed to applying the invention to a friction bearing provided with flinger grooves, but without the oil collection grooves 36, 38 of the first embodiment of FIGS. 2 and 5. The friction support bearing of this embodiment is indicated generally by reference numeral 40, and, as shown, utilizes conventional flinger grooves 42, 44. In this embodiment, the flinger grooves 42, 44, in addition to serving their conventional function of mounting the flinger rings, as disclosed in U.S. Pat. No. 3,905,659, also serve the function of the lateral-flow oil-collection grooves for the additional wicks 52, 54. The additional wicks 52, 54 are oriented at 6:00 O'clock when viewing FIG. 3, as in the first embodiment. Since the flinger grooves 42, 44 mount the flinger rings, a separate conventional flange wick 56 is conventionally mounted. In all other respects, the additional wicks 52, 54 are the same as the wicks 32, 34 of the first embodiment, and are mounted in pockets or recesses similar to those shown in FIG. 8 discussed below.

Referring to FIG. 7, there is shown a third embodiment 60 of the invention in which, instead of using the additional wicks of the first two embodiments to lubricate the additional surface contact areas B and C, oil-flow passageways 62, 64 forming a V-shape are provided on the flange or outboard end, and oil-flow passageways 66, 68 forming a V-shape are provided on the inboard end. These passageways are oriented approximately at 6:00 O'clock when viewing FIG. 7. Unlike the first two embodiments, the friction bearing 60 is provided with both oil-collection grooves 70, 72 and flinger grooves 74, 76, in a manner disclosed in U.S. Pat. No. 4,229,056. Each passageway opens into the interior of a respective flinger grooves 74, 76 for fluid communication therewith, and, thus, effectively serve as oil-flow extension grooves of the flinger grooves. The V-shaped passageways 62, 64, and the V-shaped passageways 66, 68 form an acute angle therebetween, as seen in FIG. 7, and preferably is in the range of between 15 degrees to 45 degrees, although this is not meant to be limiting. This embodiment takes advantage of the proven collection and return system of the conventional inboard and outboard ends of the bearing liner by using the flinger rings to cause oil to flow into the oil recirculation grooves and hence to be delivered to the bearing lateral areas both at the inboard and outboard ends of the bearing liner beyond that wetted by the main delivery wick. While two such passageways have been shown which are V-shaped, more than two such passageways may be employed without a V-shaped configuration.

Figure 8:
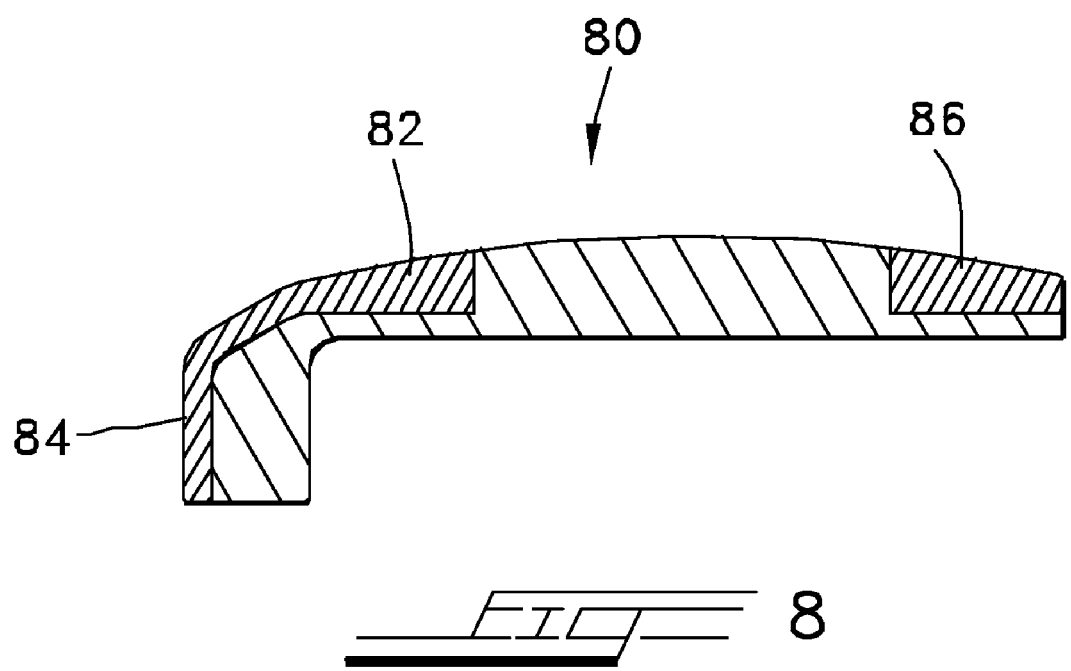
FIG. 8 is a partial longitudinal cross-section view similar to FIG. 5 of a fourth embodiment of the invention of a sleeve bearing without flinger rings or oil-collection grooves, with the outboard supplemental wick of the invention being connected to the flange wick.

Referring to FIG. 8, there is show a fourth embodiment 80 of the invention in which no flinger grooves or oil collection grooves are included in the friction bearing 80. In this case, the outboard supplemental wick 82 is connected to the flange wick 84 to form one continuous wick. The inboard supplemental wick 86 is the same as in the first two embodiments. Since the wicks are located at the 6:00 operating position, they would, therefore, receive their lubrication as a result of the natural gravity drainage accumulation from the journal wetted surfaces any time the axle would be at rest. During rotation, the normal supply wick delivers a band of oil on the axle. The supplemental or auxiliary wicks inboard ends would overlap this wetted band and take a portion of this oil to extend the wetted band width.

Figure 9:
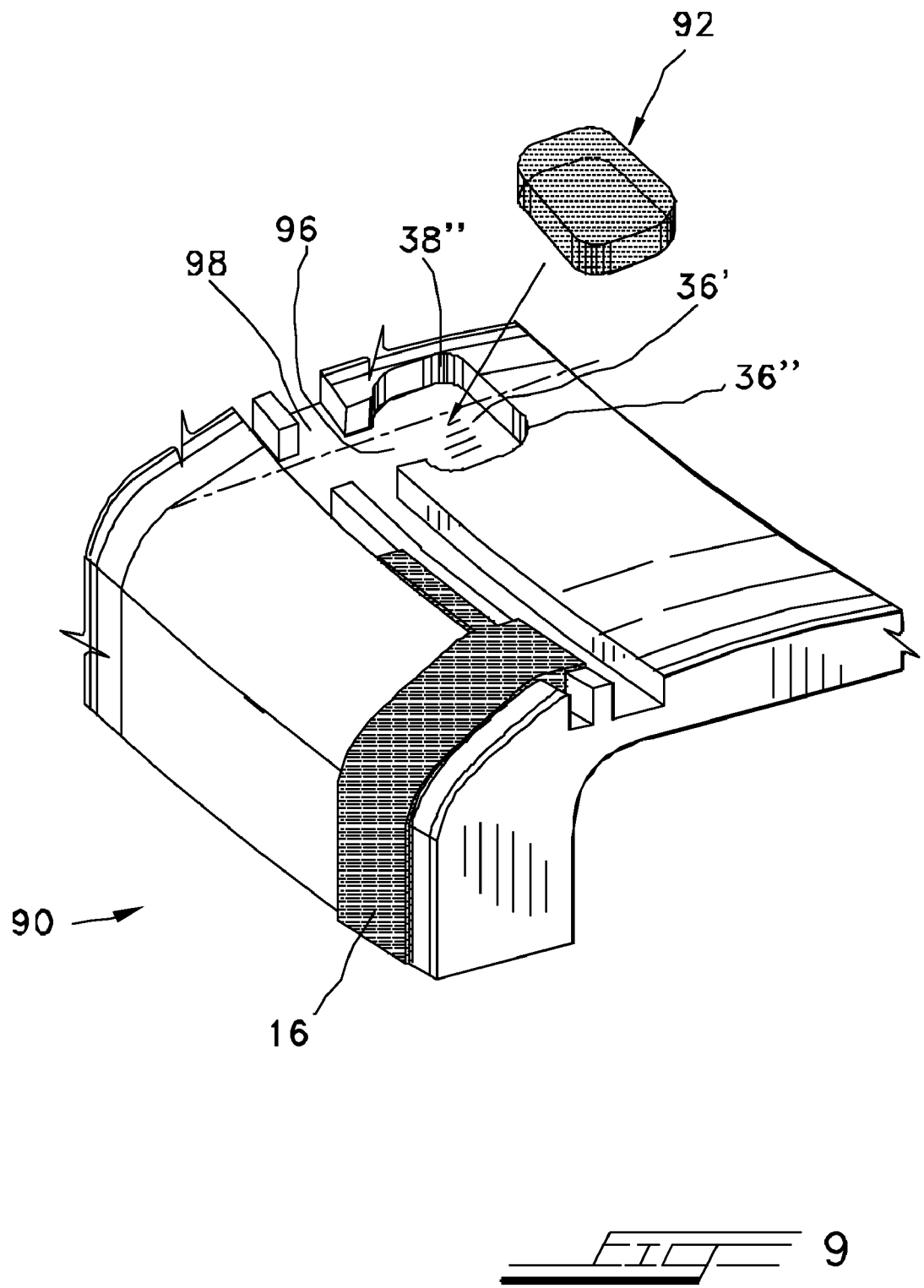
FIG. 9 is an isometric view showing a fifth embodiment of the invention utilizing both oil-collections grooves and flinger grooves at the inboard and outboard ends, and shows a pocket or recess for mounting therein an supplemental or auxiliary wick.

Referring to FIG. 9, there is shown a fifth embodiment 90 which incorporates both flinger grooves and oil-collection grooves. The supplemental or auxiliary wicks 92 are received in pockets or recesses 36' formed in the interior shell of the friction bearing. Each pocket has a depth less than that of the thickness of the respective additional wick, so that each wick projects or protrudes out from the respective pocket, and interiorly toward the axle journal mounted in the bearing, for contact against the juxtapositioned surfaces of the journal located within the lateral extent of the above-mentioned contact areas B and C. Each pocket 36' has an open end 96 that is in fluid communication with the interior of a respective flinger groove 98 for lubricating the respective supplemental or auxiliary wick in a manner similar to the embodiment of FIG. 3. It is also noted that corners 36″, 38″ of the pockets are rounded to ensure that the wicks are maintained therein.

Use of the supplemental or auxiliary wicks of the present invention allows reduced-width flinger grooves as compared to the prior art friction support bearings, and also allows for the flingers grooves to be moved farther away from the center wick. Also, it is also possible to have a version of the invention where the flinger grooves and the outboard oil-collection groove are eliminated, which would extend the usable load-carrying width approximately one more inch.

In one prototype of the friction support bearing of the invention for use with a General Electric 752 AG traction motor, the width of the crowned load-bearing surface area was increased to approximately 5.18 in. as compared to 3.76 in. for the conventional bearing. Also, each supplemental or auxiliary wick was approximately 1.25 in. in length taken in the direction parallel to the annular flinger groove and 0.81 in. in width taken in the axial bearing direction, with the thickness thereof depending upon proper contact with the axle journal juxtapositioned thereat, and was received in a pocket or recess of width of 0.81 inch and length of 1.25 inches, with the pocket having rounded corners of radius 0.312 in. similar to the rounded corners of the supplemental or auxiliary wick. In addition, the open end 96 was 0.626 in.

Figure 10:
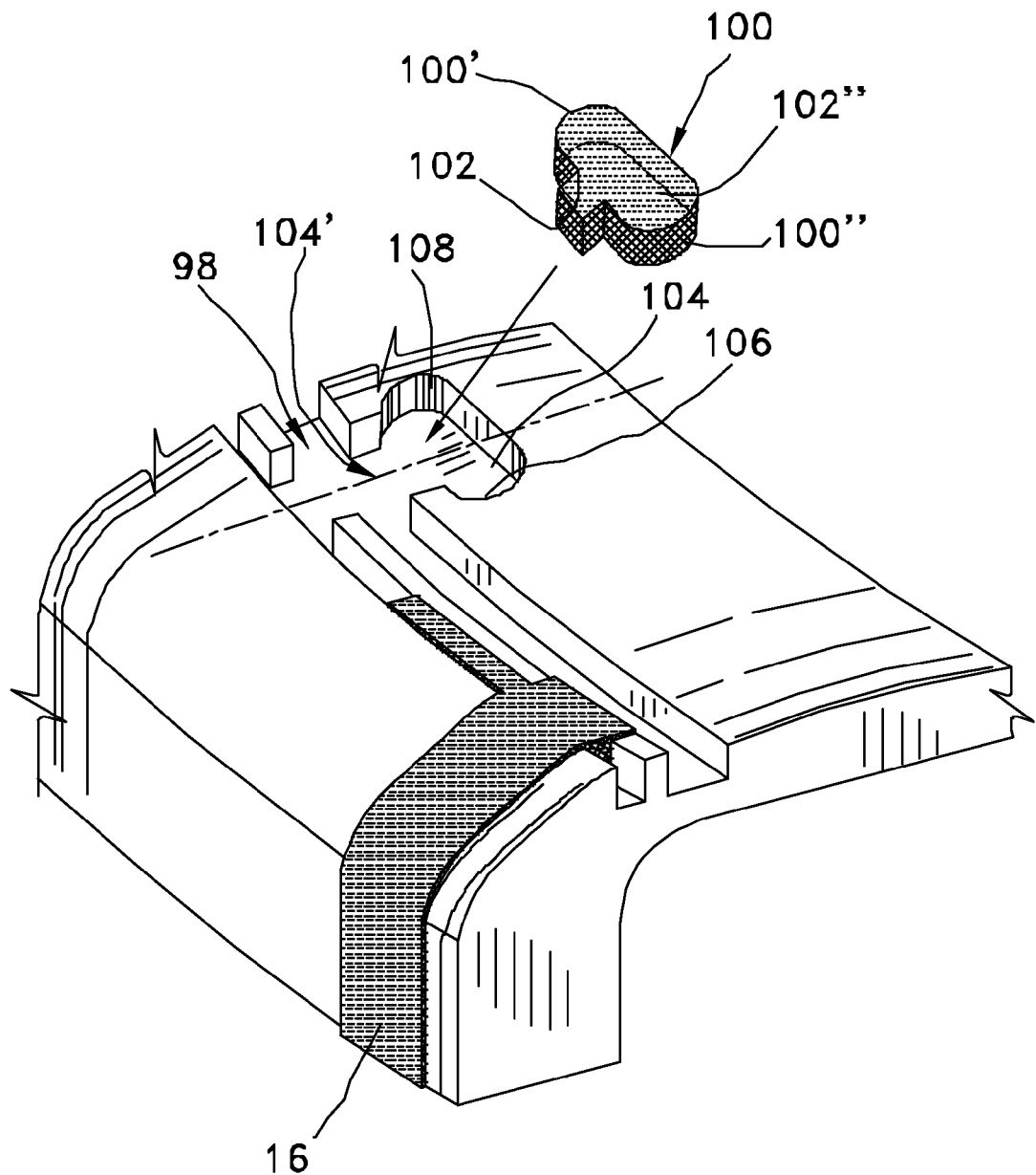
FIG. 10 is yet another modification of the invention similar to the embodiment of FIG. 9 but having a auxiliary wick of modified construction in which a tail-section is provided for better fluid communication with a respective flinger groove.
Figure 11A:
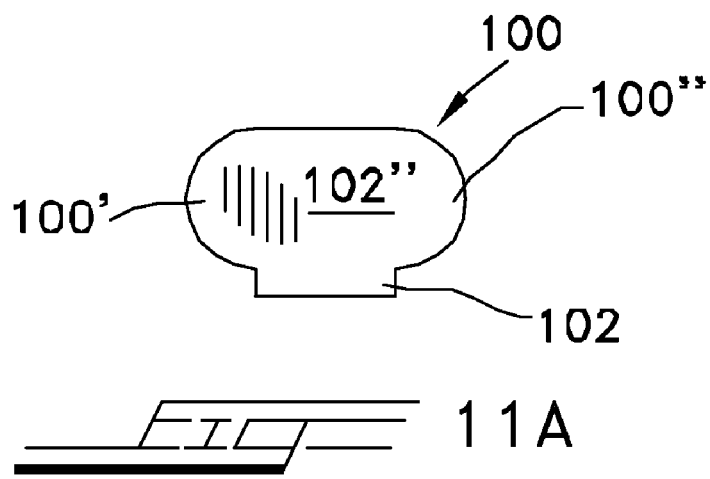
FIG. 11A is a top plan view of the modified auxiliary wick with tail-section.
Figure 11B:
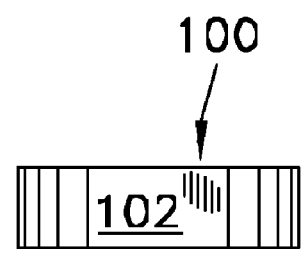
FIG. 11B is a front view of the modified auxiliary wick with tail-section of FIG. 11A.
Figure 11C:
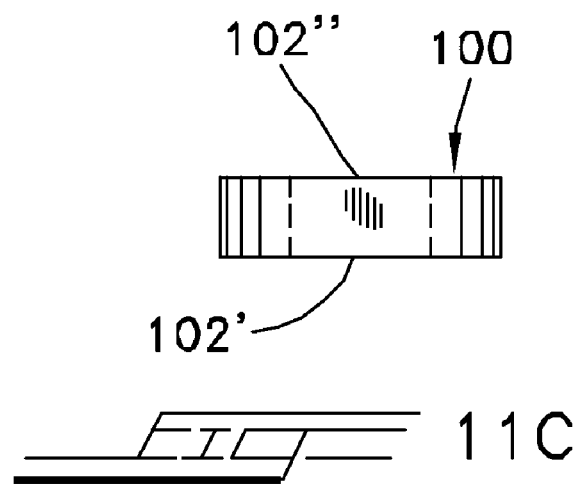
FIG. 11C is a rear view of the modified auxiliary wick with tail-section of FIG. 11A

Referring now to FIGS. 10-11C, there is shown a modification of the auxiliary wick 92 of the embodiment of FIG. 9. The shape of the auxiliary wick 100 is similar to that of the auxiliary wick 92, except that the auxiliary wick 100 is provided with a tail-section 102 which projects from the front in a direction toward the flinger groove 98. The tail-section 102 fits snugly, and may be adhesively secured, in the open end or entrance, 104' of the pocket 104. While the outboard auxiliary wick has been shown in FIG. 10, the same holds for the inboard end, as described hereinabove. By providing the tail-section 102 for each of the outboard and inboard auxiliary wicks, greater lubrication and saturation of the pad will ensue owing to the tail-section 102, and therefore the auxiliary wick 100 proper, being in direct fluid contact with the lubricant flowing in the flinger grooves. Also, the end-walls or end-surfaces 100', 100″ of the auxiliary wick 100 are more curved so that the main body proper of the wick 100 is approximately oblong or elliptical in shape. This shape helps to retain the wick 100 in its pocket 104. The ends 106, 108 of the pocket 104 are also appropriately shaped to match those of the wick 100, whereby the pocket 104 is generally oblong or elliptical in shape.

The enhanced oil saturation provided by the tail-section 102 ensures constant and direct contact with the oil in the slinger groove. This allows oil saturation from the slinger groove to be volumetrically regulated to the felt pad, or wick. In one version, the auxiliary wick 100 has an overall total length taken between 100' and 100″ of approximately 1¼ inches, a width (without a tail-section) of approximately ⅝ inch, and a depth of approximately 0.354 inch, with a tail-section 102 of a length taken in the same direction as the length of the wick 100 of ⅝ inch and width of ⅛ inch. It is, of course, to be understood that these dimensions may be varied in accordance with various requirements and factors, and are not meant to be limiting.

Figure 12:
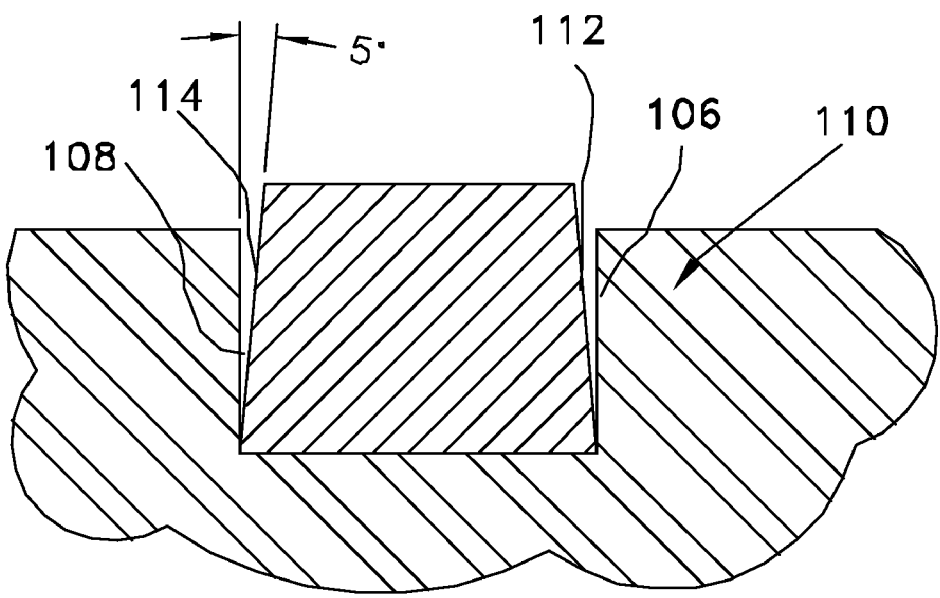
FIG. 12 is a modification of the auxiliary wick with tail-section of FIG. 11A in which the sides thereof are tapered upwardly so as to provide clearance for the wick while mounted in its opening during compression caused by contact with an axle-journal surface.

In yet another modification 110 of the auxiliary wick, as shown in FIG. 12, the auxiliary wicks of FIG. 9 or FIG. 10 may be provided with upwardly-tapering ends 112, 114 in order that there are provided ever-increasing lateral clearances between these ends 112, 114 and the corresponding end walls 106, 108 of the pocket 104 of the embodiment of FIG. 10, or of the corresponding end walls of the pocket 36' of the embodiment of FIG. 9. The provision of upwardly-tapered ends allows for the auxiliary wick to expand within its respective pocket or cavity 36' or 104 during contact of the wick-face 102″ with the surface of the rotating axle-journal and also provide more constant biasing force against the surface of the axle-journal. Depending on various factors and operating conditions, the surface-to-surface contact of the wick-face of the auxiliary wick with the surface of axle-journal causes the felt pad of the auxiliary wick to compress. By providing clearances between the ends of the auxiliary wick and the end walls of the pocket or cavity in which it is mounted, the compression of the wick pad will be accommodated by outward expansion of the auxiliary wick, thereby providing "give" upon the presence of compressions forces during operational contact with the rotating surface of the axle-journal in which the wick. Without such clearances, there is the possibility that excessive surface-to-surface contact and forces would considerably shorten the life of the wick or damage it. Each end 112, 114 of the auxiliary wick 110 preferably has a taper of approximately five degrees relative to an end wall 108 or 110, but it may vary from being close to zero up to ten degrees. For the embodiment of FIG. 9, the taper, of course, is zero. For the embodiment of FIG. 10, five degrees is preferred, though other angles may be used. In addition, each auxiliary wick may be alternatively cross-sectioned such that the end walls are at least partially upwardly and inwardly extending in order to provide clearances between its ends walls and the end walls of the pocket in which it is mounted. For example, a cross-section defining ends 112, 114 that are concave-shaped may also be used, which would also allow for clearances for expansion of the wick. It is also possible under certain circumstances to allow the entire ends 112, 114 to expand within the mounting pocket, in which case the length of the supplemental wick will be less than that of the mounting pocket, as long as adequate adhesive bonding of the bottom surface of the supplemental wick in the mounting pocket is sufficient.

Each additional wick 32, 92, and 100 is made of felt material or other comparable composite materials, in order to optimize retention and to provide enhanced capillary effect. The width of each additional wick 32, 92 is preferably less than the width of the flange wick, although such does not preclude the same or greater width. The supplemental wicks are preferably retained by adhesives, or, alternatively, by the geometry of the machined pockets or grooves which also act as reservoirs in combination with the wick geometry. In a preferred embodiment, each auxiliary wick is cut from an SAE F-10 high grade, medium low density felt of 72 inches in width having the following specifications: minimum wool content of 95&, water soluble max. of 2.5%, tensile strength of 225 PSI min. Such felt is sold by, for example, Southeastern Felt and Supply Co. of Concord, N.C., or Aetna Felt Corp. of Allentown, Pa. However, it is to be understood that felt of different grade and specification may be used if it provides the requirements that allow for the auxiliary lubrication of the surface of axle-journal as described hereinabove. The durometer hardness of this felt material is preferably of a specification indicating a softer material in order to reduce felt wick-face pressure against the axle-journal, to thus generate less heat through friction. In addition, this relatively softer felt material, along with the concomitant reduced pad pressure as described hereinabove because of the upwardly-tapering wick, result in increased oil-film thickness and greater oil-retention on the axle journal, which might otherwise be wiped off under operating conditions. It is, of course, to be understood that numerous felt grades or equivalent material may be used meeting the requirements specified herein.

Figure 13:
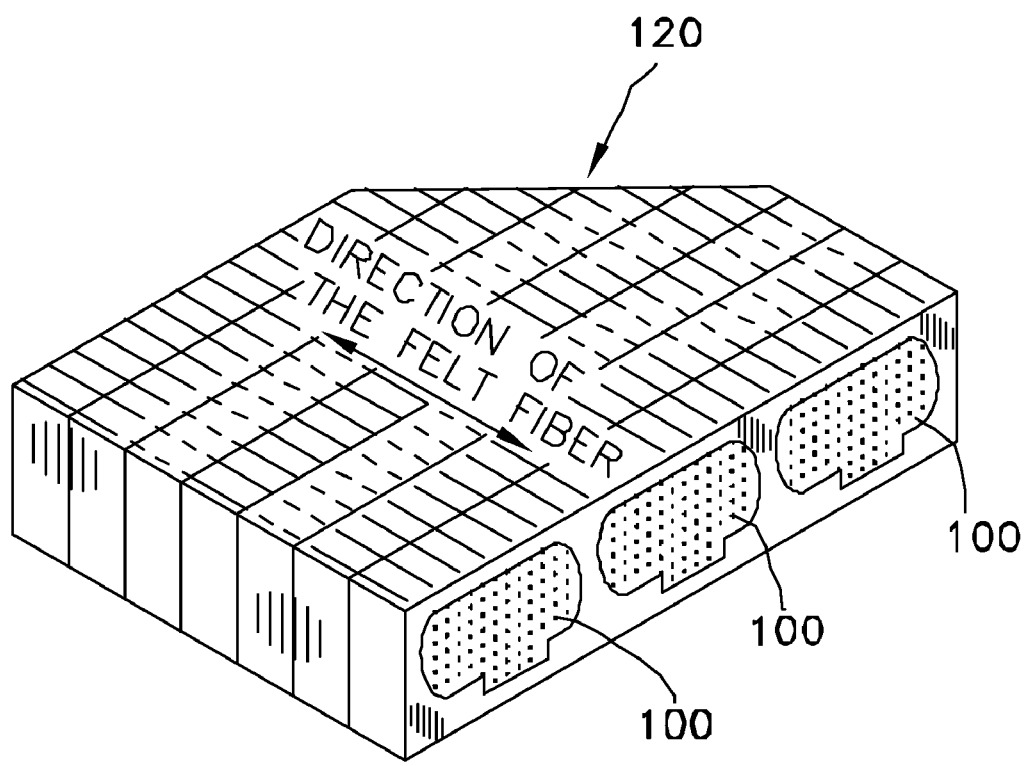
FIG. 13 is an isometric plan view of a supply of felt pad from which the modified auxiliary wick with tail-section of FIG. 11A are cut out so that the felt-fibers thereof are oriented in a direction such that they will lie perpendicular to the longitudinal axis of an axle-journal in which it will have contact.

In accordance with the invention, regardless of the particular felt grade used, the felt is not cut in usual manner along which, conventionally, is transverse the direction or length of the felt fibers making up the felt. Instead, in accordance with the invention, the supply of felt is cut along, or parallel, to the length of the fibers constituting the supply felt, as shown in FIG. 13. Referring to FIG. 13, the auxiliary wicks or pads, for example 100, are cut from a supply of felt 120 in a direction such that the fibers of each pad extend in a longitudinally axial direction from the bottom surface 102' toward the upper axle-journal-engaging surface 102". Thus, when an auxiliary wick 32, 92 or 100, is in surface contact with the surface of the axle-journal, substantially only the ends of the felt fibers are in contact therewith. Ensuring that only substantially the ends of the felt fiber contact the rotating axle-journal surface is very important in cold climates, under which conditions the face of the felt wick may freeze to the axle. If the felt fibers of the auxiliary wick pads were to run substantially parallel to the axis of rotation of the axle-journal, under freezing conditions, pieces of the actual felt of the wick face or the entire felt could be pulled or torn loose from its position, creating a potential bearing failure. Thus, to remedy this condition, the felt wick is not only adhesively, or otherwise secured, in its pocket or groove, but the longitudinal directional orientation of the felt fibers of the wick extends perpendicular to the wear face of the felt and, thus, also perpendicular to the longitudinal axis of rotation of the axle-journal. With the felt fibers oriented in this manner, if freezing conditions occur, only the portions of the felt fibers would be pulled or torn from the felt wick.

While specific embodiments of the invention have been shown and described, it is to be understood that numerous changes and modifications may be made therein without departing from the scope and spirit of the invention.

What is claimed is:

1. In a friction support bearing for a railway locomotive traction motor comprising a main bearing housing having an inboard end portion and an outboard end portion, and a central wick window for a central lubricating wick, an interior surface at least a part of which contacts an axle-journal, the improvement comprising:

two supplemental lubricating wicks, one located at said inboard end-portion and one located at said outboard end-portion; and further comprising an inboard flinger and an outboard flinger groove, and an inboard mounting pocket for mounting said inboard supplemental wick for fluid communication with said inboard flinger groove, and an outboard mounting pocket for mounting said outboard supplemental wick for fluid communication with said outboard flinger groove;

each of said supplemental lubricating wicks comprising a main body portion having an upper wick-face surface that contacts a surface of an axle-journal, a bottom surface, a pair of end-surfaces, and a forward-facing tail-section;

said main bearing housing further comprising an inboard flinger and an outboard flinger groove, and an inboard mounting pocket for mounting said inboard supplemental wick for fluid communication with said inboard flinger groove, and an outboard mounting pocket for mounting said outboard supplemental wick for fluid communication with said outboard flinger groove;

each said pocket extending axially away from a respective said oil groove and lying adjacent to and in fluid communication with said respective oil groove, and having a main portion that is approximately the same shape as a respective said supplemental wick, end-walls, and an entrance opening in fluid communication with said respective groove, said tail-section being mounted in said entrance opening, whereby the supplemental wick is continuously lubricated by lubricant circulating in said respective oil groove;

each said mounting pocket having a depth less than the depth of the said respective supplemental wick, so that said respective supplemental wick contacts against a juxtapositioned portion of an axle-journal located thereat.

2. The friction support bearing for a railway locomotive traction motor according to claim 1, wherein at least some portions of said end-surfaces of said main body portion of each supplemental wick are spaced from said end-walls of a said mounting pocket in order to provide clearance between said end-surfaces and said end-walls of a said mounting pocket, whereby upon compression of said supplemental wicks during use, said supplemental wicks may expand within said pockets.

3. The friction support bearing for a railway locomotive traction motor according to claim 1, wherein said at least one supplemental wick is made of lubricant-absorbing material consisting of elongated fibers each defining a length; the length of said fibers being oriented substantially perpendicular to said upper wick-face surface and substantially perpendicular to the longitudinal axis of rotation of an axle-journal mounted in said support bearing, whereby breakage and tearing of said at least one supplemental wick is reduced.

4. The friction support bearing for a railway locomotive traction motor according to claim 1, wherein each said supplemental lubricating wick is located approximately at the 6:00 position of said main bearing housing.

5. In a friction support bearing for a railway locomotive traction motor comprising an main bearing housing having an inboard end portion and an outboard end portion, a central wick window for a central lubricating wick, an interior surface at least part of which contacts an axle-journal; said outboard end of said interior surface having an oil groove, and said inboard end of said interior surface also having an oil groove, the improvement comprising:
   a first outboard supplemental lubricating wick at said outboard end portion, and a second inboard supplemental wick at said inboard end portion, for additionally lubricating the contact surface area between said interior surface and said axle-journal axially beyond the limits of said central lubricating wick;
   each of said first and second supplemental lubricating wicks being located approximately at the 6:00 position of said main bearing housing;
   each of said first and second supplemental wicks extending axially interiorly from, and in fluid communication with, a respective said oil groove;
   said interior surface comprising an inboard-end mounting pocket for mounting said inboard-end supplemental wick, and an outboard-end mounting pocket for mounting said outboard-end supplemental wick, each said pocket extending axially away from a respective said oil groove; each of said mounting pockets having a depth less than the thickness of the respective said supplemental wick, so that each said supplemental wick contacts against a juxtapositioned portion of an axle journal located thereat; each said mounting pocket further comprising an inlet opening that opens into, and is in fluid communication with, a respective said oil groove for allowing the respective said supplemental wick to be in fluid communication with the interior of the respective said oil groove;
   each said supplemental wick comprising a main body portion having an upper wick-face surface that contacts a surface of an axle-journal, a bottom surface, and a pair of end-surfaces; at least some portions of said end-surfaces of said main body portion of each said supplemental wick being spaced from said end-walls of a respective said mounting pocket in order to provide clearance between said end-surfaces and said end-walls of the respective said mounting pocket, whereby upon compression of a said supplemental wick during use, said supplemental wick may expand within the respective said mounting pocket.

6. The friction support bearing for a railway locomotive traction motor according to claim 5, wherein said end-surface are upwardly-tapering in order to provide clearance between said end-surfaces and said end-walls of a said mounting pocket.

7. The lubricating wick for use in a friction support bearing for a railway locomotive traction motor according to claim 6, wherein said pair of end-surfaces are upwardly-tapering at an angle of approximately five degrees.

8. The friction support bearing for a railway locomotive traction motor according to claim 5, wherein main body portion of each said supplemental lubricating wick fhrther comprises a forward-facing tall-section; each said mounting pocket having a main portion that is approximately the same shape as said supplemental wick and end-walls, and an entrance opening in fluid communication with a respective said oil groove, said tail-section being mounted in said entrance opening, whereby the supplemental wick is continuously lubricated by lubricant circulating in the respective said oil groove.

9. A method of extending the lubricated contact surface area of a friction support bearing for a railway locomotive traction motor and an axle journal mounted therein, said friction support bearing comprising a main bearing housing having an inboard end portion and an outboard end portion, a central wick window for a central lubricating wick, and an interior liner defining a central interior portion thereof that contacts an axle-journal for support thereby, said method comprising:
   (a) supplementally lubricating the interior outboard surface of said interior liner for extending the surface contact-area between said interior liner and said axle journal beyond said central interior portion in an outboard direction;
   (b) supplementally lubricating the interior inboard surface of said interior liner for extending the surface contact-area between said interior liner and said axle journal beyond said central interior portion in an inboard direction;
   (c) each of said steps (a) and (b) comprising providing a supplemental outboard wick and providing a supplemental inboard wick, respectively;
   (d) each of steps (a) and (b) comprising mounting the respective said supplemental wick in a mounting pocket formed in said main housing such that the upper wick-face surface thereof projects outwardly from the respective said mounting pocket for surface-to-surface contact with a surface-portion of an axle-journal mounted in said friction bearing;
   (e) said step (d) comprising spacing at least a portion of the end-surfaces of the respective supplemental wick from the end-walls of the respective mounting pocket, and allowing the respective said supplemental wick expansion in the respective said mounting pocket during operating conditions when compressed by contact against a surface-portion of an axle-journal mounted in said friction bearing.

* * * * *